US006470941B1

(12) United States Patent
Wehr

(10) Patent No.: US 6,470,941 B1
(45) Date of Patent: Oct. 29, 2002

(54) METHOD AND DEVICE FOR WELDING STRIPS OF A THERMOPLASTIC MATERIAL

(75) Inventor: Hubert Wehr, Bornheim (DE)

(73) Assignee: Cyklop GmbH, Cologne (DE)

( * ) Notice: Subject to any disclaimer, the term of this patent is extended or adjusted under 35 U.S.C. 154(b) by 0 days.

(21) Appl. No.: 09/719,473

(22) PCT Filed: May 15, 1999

(86) PCT No.: PCT/DE99/01483

§ 371 (c)(1),
(2), (4) Date: Dec. 11, 2000

(87) PCT Pub. No.: WO00/03864

PCT Pub. Date: Jan. 27, 2000

(30) Foreign Application Priority Data

Jul. 15, 1998 (DE) .......................................... 198 31 665

(51) Int. Cl.⁷ ............................................... B32B 31/20
(52) U.S. Cl. ........................ 156/358; 156/359; 156/580; 156/73.5; 156/73.6; 156/583.1
(58) Field of Search .......................... 53/590, 505, 589, 53/592, 399; 100/48, 49, 50, 51, 52, 4; 156/73.5, 358, 64, 359, 357, 360, 361, 378, 494, 580, 583.1, 73.6, 502

(56) References Cited

U.S. PATENT DOCUMENTS

| | | | |
|---|---|---|---|
| 4,384,186 A | 5/1983 | Burt | |
| 4,631,685 A | 12/1986 | Peter | |
| 4,776,905 A | 10/1988 | Cheung et al. | |
| 5,321,230 A | * | 6/1994 | Shanklin et al. ............. 219/492 |

FOREIGN PATENT DOCUMENTS

| | | |
|---|---|---|
| DE | 834 899 | 3/1952 |
| DE | 119 187 | 4/1976 |
| DE | 28 02 034 B1 | 6/1979 |
| DE | 43 21 874 A1 | 1/1995 |
| DE | 44 22 147 A1 | 1/1996 |
| DE | 195 27 417 A1 | 2/1997 |
| EP | 0 340 671 B1 | 12/1995 |
| FR | 1 494 989 | 9/1967 |
| FR | 2 364 751 | 4/1978 |
| JP | 59-048117 | 3/1984 |
| JP | 61-047239 | 3/1986 |
| JP | 10-264255 | 10/1998 |

OTHER PUBLICATIONS

International Search Report, dated Nov. 15, 1999.
International Preliminary Examination Report, dated Jul. 18, 2000.

* cited by examiner

Primary Examiner—Richard Crispino
Assistant Examiner—George R. Koch, III
(74) Attorney, Agent, or Firm—Fay, Sharpe, Fagan, Minnich & McKee

(57) ABSTRACT

A process and an apparatus for welding straps of thermoplastic plastics, wherein the supply of heat which is necessary for welding is controlled depending on the thickness at the weld of the straps which are to be welded to each other and is not switched off until said thickness falls below a predetermined set value.

6 Claims, 5 Drawing Sheets

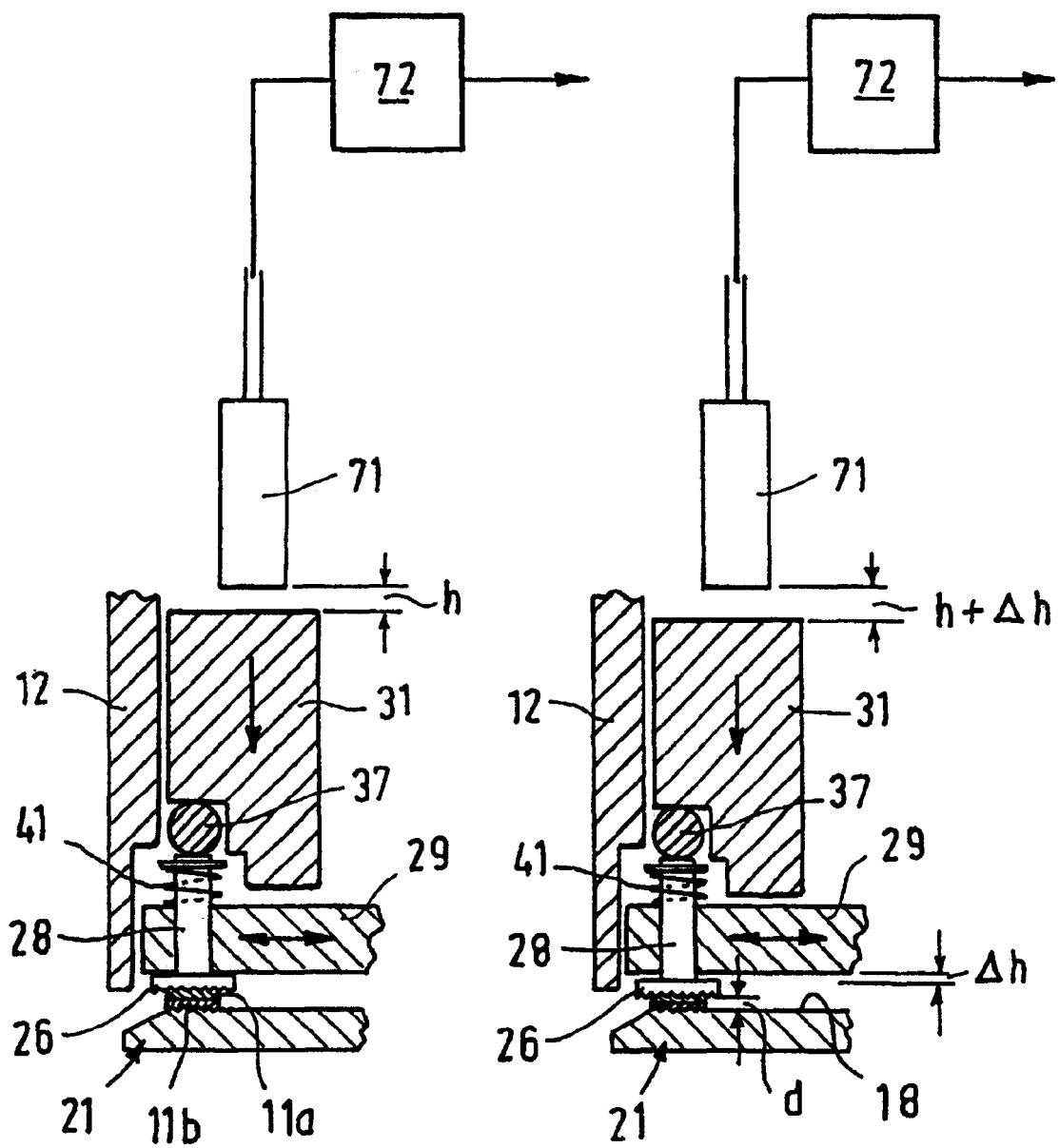

METHOD AND DEVICE FOR WELDING STRIPS OF A THERMOPLASTIC MATERIAL

FIELD OF THE INVENTION

This invention relates to a process and an apparatus for welding straps made of thermoplastic plastics, particularly packaging straps made of polypropylene or the like, which are heated over a limited welding region on their mutually facing faces and are pressed on to each other under the action of pressure.

BACKGROUND OF THE INVENTION

During the welding of straps made of plastics it is customary to supply or to generate welding heat for a predetermined period of time which experience has shown is sufficient to soften the straps sufficiently in the weld region and intimately to fuse them to each other on the application of pressure. It has been shown in this respect, however, that the strength of the weld is not always satisfactory, and that welding has not been performed correctly. The reason for this is based on environmental effects and on irregularities in the supply of heat, which occur, for example, if there is a drop in the voltage of an electrical source of heat and thus in the temperature also. Particularly when employing friction welding devices which are operated by an accumulator independently of the mains, the number of revolutions also becomes less as the voltage decreases, so that the oscillating device, which moves the superimposed straps towards each other in order to generate frictional heat, moves more slowly. The resulting welding time is then no longer sufficient to generate the requisite welding heat, and intimate fusion of the straps in the weld region no longer occurs.

SUMMARY OF THE INVENTION

The object of the invention is to avoid these disadvantages and to provide a process and an apparatus with which plastics straps can be welded to each other in a simple and reliable manner, even under changing environmental effects. This object is achieved by the invention in that in order to ensure correct welding the change in the total thickness of the straps which are welded to each other is determined during the welding operation and is compared with a predetermined set value.

The process according to the invention has the advantage that the strength of each weld is tested, since in fact the total thickness of the straps which are welded to each other at the weld location depends on the softening of the plastics and the intimate fusion thereof, and is thus at the same time a measure of the strength of the welded joint. Depending on a predetermined total thickness, the supply of heat to the straps which are welded to each other is not interrupted until satisfactory fusion of the straps in the welding region is achieved.

Since the duration of the supply of welding heat no longer plays a part, perfect welding operations can be carried out using accumulator-operated devices, even if the voltage of the accumulator has already dropped, since the lower temperature is compensated for by a longer time of action.

An apparatus for welding straps made of thermoplastic plastics, particularly of packaging straps made of polypropylene or the like, which is provided with a heating device for heating mutually facing faces of the straps which are to be joined to each other, and which is provided with a pressure element which can be moved at the weld approximately perpendicularly to the weld faces in order to compress the straps which are superimposed on a supporting surface, is characterised according to the invention in that the heating device comprises a switch-off device, which is operated directly or indirectly by the pressure element as soon as the thickness of the weld, and thus the distance between the pressure element and the supporting surface, falls below a predetermined set value.

A welding apparatus which is constructed in this manner does not automatically switch off the supply of welding heat until sufficient heating and fusion of the straps is achieved at the weld, which is manifested by a decrease in the total thickness of the superimposed straps at the weld.

In the apparatus according to the invention, a signal transmitter can be associated with the pressure element, which signal transmitter determines the changes in the distance between the pressure element and the supporting surface and feeds corresponding signals to an evaluation electronics unit, which generates a switch-off signal in order to switch off the heating device when the distance between the pressure element and the supporting surface reaches a predetermined set value. Sensors can be used here which determine the changes in distance in a contactless manner, e.g. by an optical route, electromagnetically, or by ultrasound.

In a mechanically operated welding apparatus, the pressure element can be connected to a sensing element which senses the surface of the superimposed unwelded straps and which comprises an operating element for switching off the heating device. The pressure element here is displaceable to a limited extent in relation to the sensing element in a direction towards the supporting surface, and during its displacement acts on the operating element, which switches off the heating device as soon as the weld has reached the predetermined thickness.

The operating element can be a lever which is swivel-mounted on the sensing element, which lever is acted upon by a driver disposed on the pressure element and which comprises an adjustable switching finger at one free end, which switching finger operates a first switch when the displacement of the pressure element in relation to the sensing element reaches a predetermined value.

By adjusting the switching finger, the set value for the total thickness at the weld of the straps to be welded to each other can be adjusted.

It is advantageous if the first switch comprises a normally closed contact and is connected in series with a second switch which switches on the heating device if said second switch is operated during the action of pressure of the pressure element.

A particularly simple form of construction is achieved if the sensing element comprises a driver pin, the free end of which fits into an elongated recess, which extends in an axial direction, in the pressure element, in which recess it is held pressed by a spring element against the end face of the recess which faces the supporting surface, and in which recess it can move against the action of the spring element when the pressure element moves in relation to the sensing element in a direction towards the supporting surface during welding.

The welding heat can be generated at the weld location in various ways. In one preferred embodiment of the invention, the heating device can be a friction welding device, the oscillating lever of which moves a pressure piece which detects the upper strap, and which is part of the pressure element and is pressed together with the latter in a direction towards the supporting surface and is moved transversely to the plane of the strap by the oscillating lever and generates frictional heat between the straps at the weld location.

In another embodiment, the heating device can comprise a heating resistance wire which is disposed at the weld location between the straps which are to be welded to each other, which heats the straps at the weld and which is embedded in the straps when it is compressed by the pressure element and remains there.

The process according to the invention, and preferred embodiments of the apparatus according to the invention, are explained in more detail with reference to examples of embodiments by the description given below and by the drawings, where:

BRIEF DESCRIPTION OF THE DRAWINGS

FIGS. 7 and 8 show another embodiment of the invention, as illustrations corresponding to that of FIG. 5, before and after the welding operation.

DETAILED DESCRIPTION OF THE INVENTION

Figure 1:
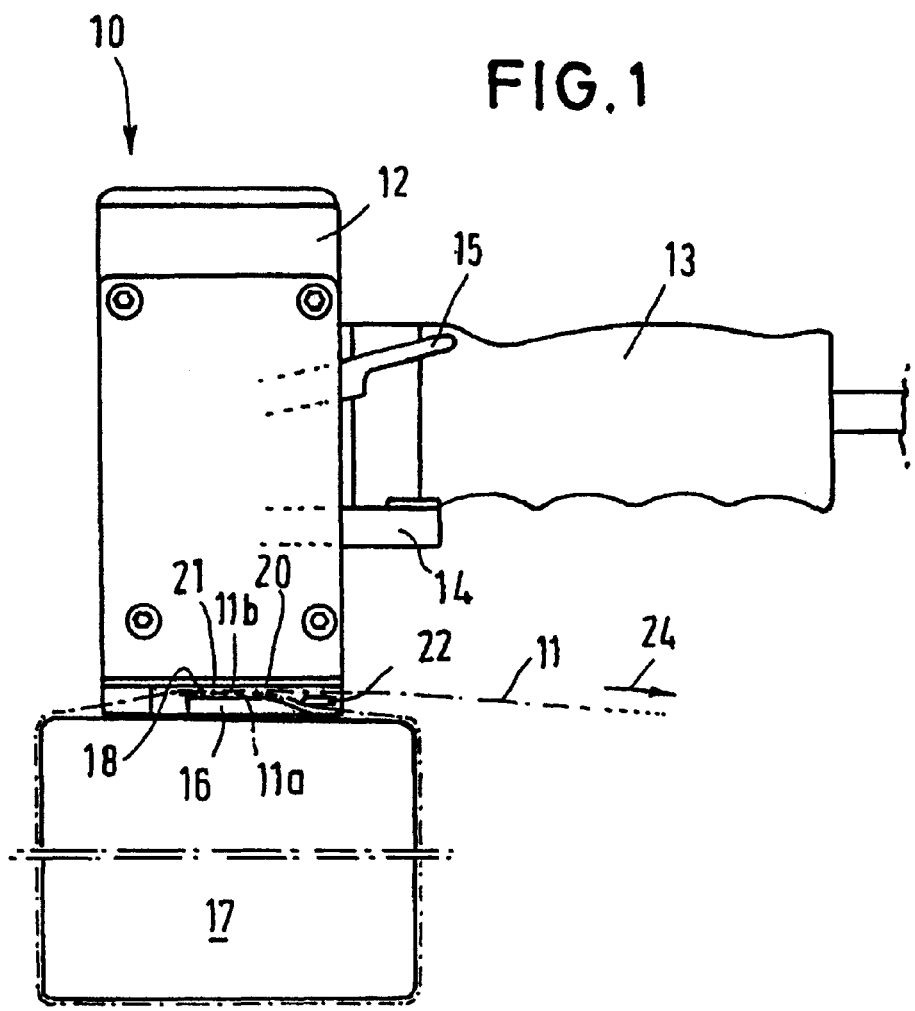
FIG. 1 is a side view of an apparatus for welding and cutting off thermoplastic tightening straps made of plastics.
Figure 2:
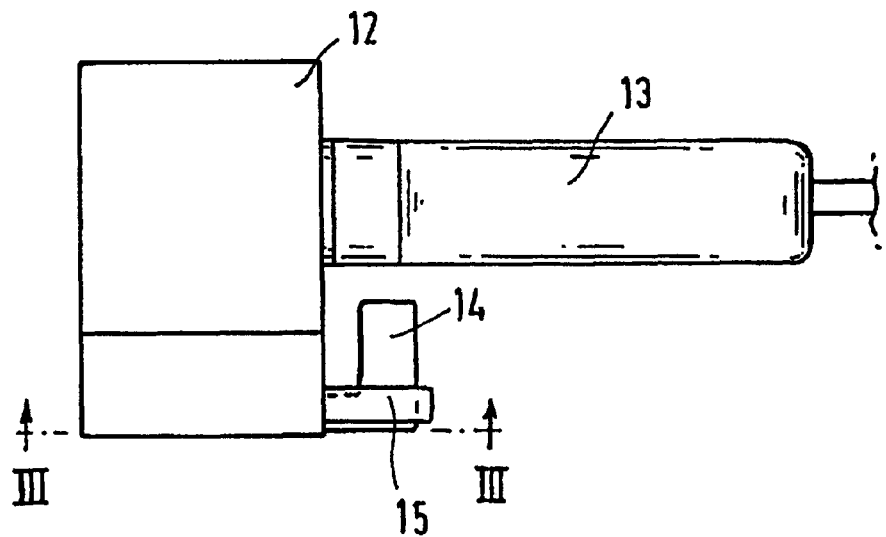
FIG. 2 is a plan view of the subject of FIG. 1.

In the drawings, reference numeral 10 denotes an apparatus for welding straps II made of plastics, which is constructed as a manually operated device and which comprises a housing 12, a handle 13, a clamping lever 14 and a operating lever 15. A laterally protruding supporting plate 16 is situated on the underside of the housing 12, and enables the apparatus 10 to be placed on a packing unit 17 around which a strap I1 made of plastics is to be looped.

Figure 3:
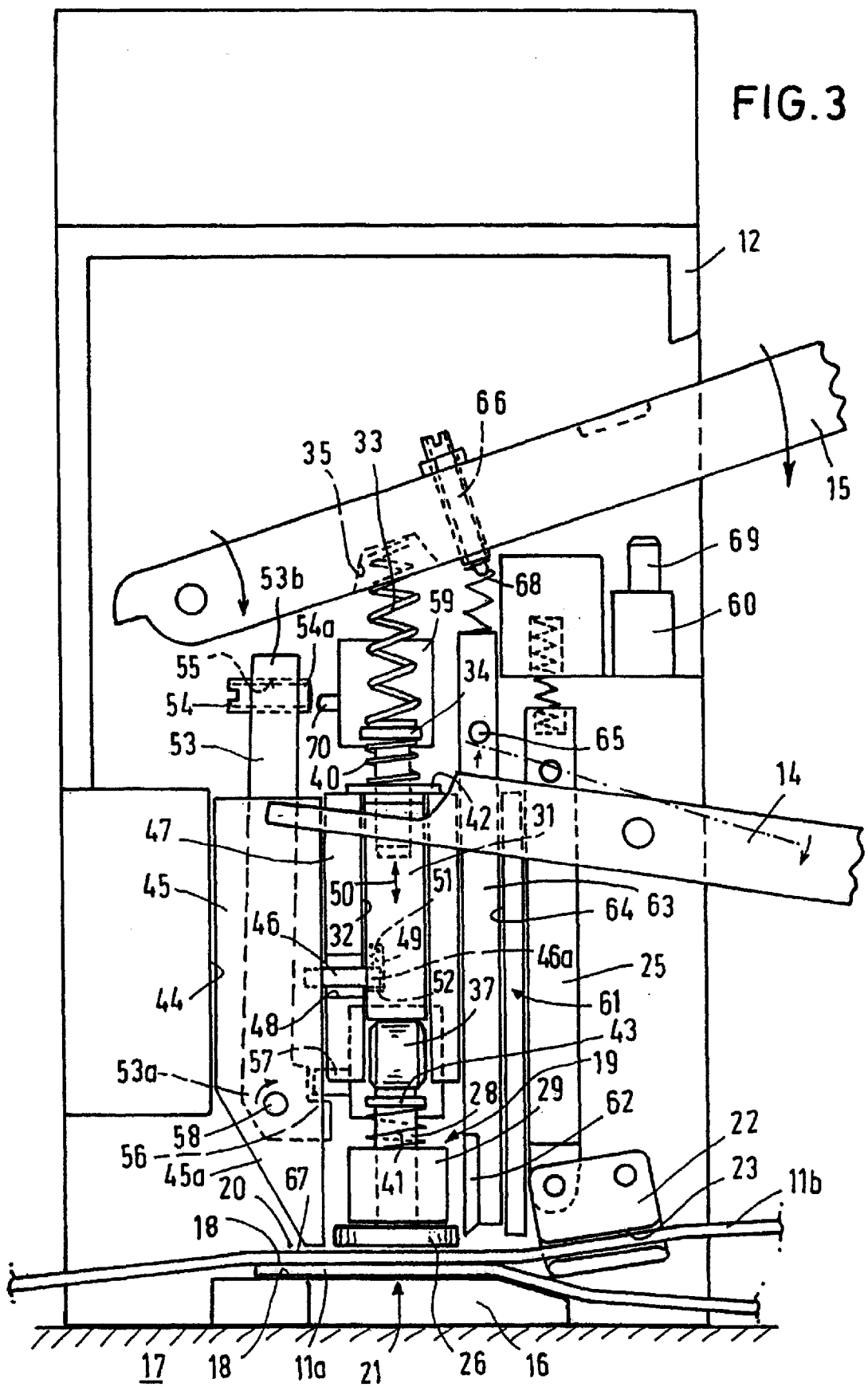
FIG. 3 shows the subject of FIG. 2 as a vertical section on an enlarged scale along line III—III, with the inserted plastics straps before the commencement of the welding operation.

The upper supporting surface 18 of the supporting plate 16 and the welding apparatus 19 which is accommodated in the housing 12 form a strap channel 20, in which the strap ends 11a and 11b of the strap 11 which is placed round the packing unit 17 are inserted so that they are superimposed on the supporting surface 18, which delimits a welding region or which delimits the weld location 21. The lower strap end 11a is clamped to the supporting plate 16 by means of a swivelling clamp 22 and the upper strap end 11b is pulled through an opening 23 in the clamp 22 and is held tensioned in the direction of the arrow 24 by a tensioning device, which is not illustrated, or by hand (FIG. 3).

When the strap ends 11a and 11b are inserted in the strap channel 20, the clamp 22 is lifted by raising the spring-loaded pressure bar 25, which is linked to the clamp 22, by means of the clamping lever 14.

The welding apparatus 19 by means of which the strap ends 11a and 11b, which are superimposed and tensioned on the supporting surface 18 of the supporting plate 16, are welded to each other, is a friction welding device with which the heat for welding the superimposed strap ends 11a and 11b is generated, by moving the strap ends 11a and 11b, which are firmly pressed on to each another, to and fro in relation to each other. Friction welding devices of this type are known and are described and illustrated, for example, in German Patents No. 31 18 710, No. 28 02 034 and No. 29 33 302. The friction welding device which is used in the present invention, which constitutes the heating device for generating the heat which is necessary for welding, will therefore not be described in greater detail here, but reference is made instead to the aforementioned patent specifications, where the only parts of the friction welding device which will be mentioned are those which cooperate with other parts which are essential to the present invention.

The welding apparatus, which generates frictional heat and which thus constitutes the heating device 19 in the sense of the invention, comprises a pressure piece 26 which is shown in FIGS. 3 to 6. Said pressure piece rests on the upper strap end 11b and its furrowed underside is in positive engagement with the upper strap end 11b. A peg 28 which is fixed to the upper face of the pressure piece 26 fits through an oscillating lever 29, which is moved to and fro in a rapid sequence, by an eccentric drive which is not illustrated, in the direction of the arrow 30 transversely to the longitudinal direction of the strap 11. In the course of this procedure, the furrowed underside 27 of the pressure piece 26 entrains the upper strap end 11b and rubs it to and fro on the lower strap end 11a, whereby frictional heat is generated at the weld location 21. The frictional heat heats the strap ends 11a and 11b over a limited welding region to such an extent that the plastics material of the strap ends melts on the mutually facing surfaces thereof and the plastics mix with each other, whereby the strap ends are welded to each other under the action of pressure.

The pressure which is necessary for generating frictional heat and for producing the weld is generated by a pressure element 31, which is formed by a pressure plunger, which is vertically displaceable above the pressure piece 26 in a sliding guide 32. The pressure element 31 is subjected to the action of a powerful pressure spring 33, which in turn is supported at one end on an upper collar 34 of the pressure element 31 and at its other end in a recess 35 in the aforementioned operating lever. At its lower end 31a, the pressure element 31 has a recess 36 which is open at its edge and in which a pressure roller 37 is accommodated via which the pressure element 31 acts on the upper end face 38 of the peg 28 whilst the latter is moved to and fro under the pressure roller 37 by the oscillating lever 29.

It can be seen that the pressure spring 33 is compressed and attempts to press the pressure element 31 downwards when the operating lever 15 is swivelled clockwise in the direction of the arrow 39. When the operating lever 15 is released, pressure can no longer be exerted on the pressure piece 26, but the latter remains resting on the upper strap end 11b due to its own weight. So that it can be raised, and so that the pressure element 31 returns to an upper inoperative position in which the aforementioned strap channel 20 becomes free for the insertion and withdrawal of the straps, two lifting springs 40 and 41 are provided, the upper lifting spring 40 of which is supported at one end on a ring 42 which is positioned above the sliding guide 32 and at its other end against the underside of the upper collar 34, and the lower lifting spring 41 of which rests on the oscillating lever 49 and exerts pressure from below against a peg collar 43. The pressure element 31, the pressure roller 37 and the peg 28 with its pressure piece 26 are thereby held in positive engagement even in their raised state.

Figure 4:
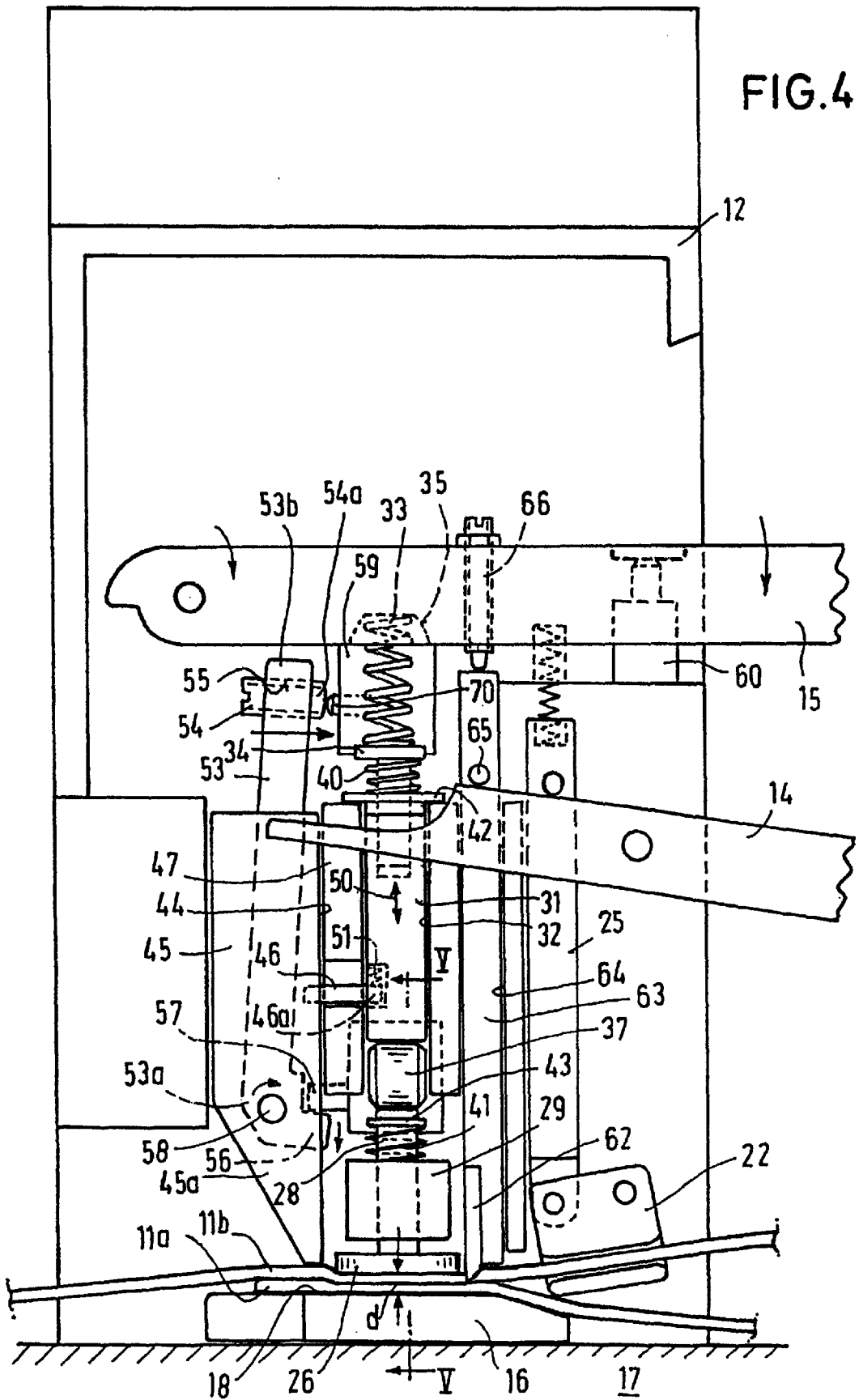
FIG. 4 is an illustration analogous to that of FIG. 3, showing the welding apparatus on the completion of the welding operation.
Figure 5:
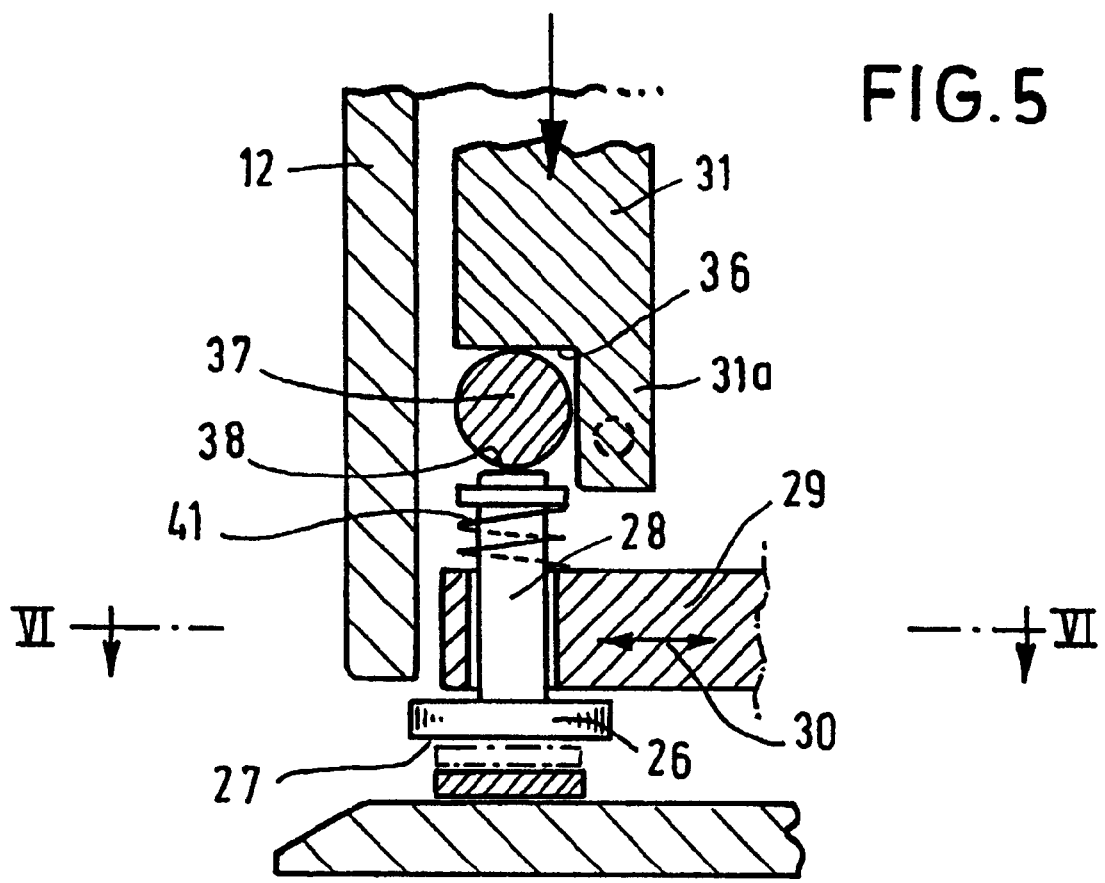
FIG. 5 shows the subject of FIG. 4 as a partial vertical section along line V—V.
Figure 6:
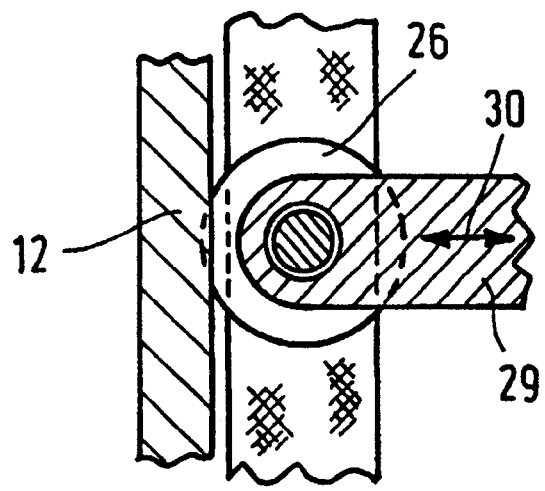
FIG. 6 shows the subject of FIG. 5 as a horizontal section along line VI—VI.

It can be seen from FIGS. 3 and 4 that a second sliding guide 44, in which a sensing element 45 can slide parallel to the pressure element 31, is provided at the side of and near to the first sliding guide 32 for the pressure element. On its side facing the pressure element 31, the sensing element 45 has a driver pin 46, which fits through an elongated hole 48 disposed in the wall 47 between the sliding guides 32 and 44 and the free end 46a of which fits into an elongated recess 49 which is disposed in the pressure element 31 and extends in an axial direction 50. The free end 46a of the driver pin 46 is under the action of a small spring element 51, which holds the driver pin 46 pressed against the end face 52 of the elongated recess 49 which faces the supporting surface 18.

Behind the sensing element 45 there is an operating element 53 in the form of an elbow lever which is swivel-mounted at the lower end 45a of the sensing element and which bears a switching finger 54 at its upper, free end 53b. The switching finger 54 is constructed as a grub screw which can be adjusted in a tapped hole 55 so that its bottom end 54a protrudes beyond the operating element 53 to a greater or lesser extent.

At its lower end 53a, the operating element 53 has a laterally protruding limb 56, which is acted upon by a driver 57 disposed on the pressure element 31 so that the operating element swivels clockwise about its pivot 58 when the pressure element 31 is moved downwards in relation to the sensing element 45.

A first switch 59 and a second switch 60, which are connected in series, are provided for switching the heating device 19 on and off, i.e. in the present case for switching the friction welding apparatus on and off. The first switch 59 has a normally closed contact, which normally holds it in its closed position. However, the second switch 60 is normally open and is closed when the operating lever 15 is pressed down on to it. If both switches 59 and 60 are closed, the heating device 19, i.e. the friction welding apparatus, is supplied with current and is thereby set in operation.

The apparatus shown in FIGS. 3 and 4 additionally comprises a cutting device 61, with which the upper strap end 11b is cut off during the welding operation. The cutting device 61 consists of a cutter 62 which is fixed to the lower end of a cutter bar 63 which is guided parallel to the pressure element in a third sliding guide 64. When the clamp 22 is raised, the cutter bar is entrained by the clamping lever 14 which engages below the lifting pin 65. When the operating lever 15 swings downwards the cutter bar is pressed down by a pressure pin 66 which is disposed in the operating lever 15.

The mode of operation of the apparatus is as follows:

After the strap 11 has been placed round the packing unit 17 and the strap ends 11a and 11b have been inserted in the strap channel 20 with the clamp 22 raised, and after the lower strap end 11a has been clamped by releasing the clamping lever 14, the upper strap end 11b is tensioned by pulling it in the direction of the arrow 24. The apparatus 10 is then in the position illustrated in FIG. 3, in which the pressure piece 26 and the sensing element 45 are situated above the strap ends 11a and 11b which are superimposed at the weld location 21. The first switch 59 of the switch-off device is closed and the second switch 60 of the switch-off device for the heating device 19 is open.

In order to weld the strap ends 11a and 11b to each other, the operating lever 15 is pushed down. In the course of this procedure, it swivels clockwise and produces the following effects:

a) It compresses the pressure spring 33, which thereby overcomes the pressure of the lifting springs 40 and 41 and presses the pressure element 31, and with it the sensing element 45, the pressure roller 37, the peg 28 and the pressure piece 26, against the surface 67 of the superimposed strap ends 11a and 11b;

b) it pushes the cutter bar 63 downwards with the pressure pin 66 via the cutter spring 68, so that the cutting edge of the cutter 62 rests on the upper strap end under spring pressure;

c) it presses on the switching pin 69 of the second switch 60 and thereby closes the circuit via which energy is supplied to the heating device 19, namely to the friction welding apparatus. The drive which is not illustrated but which is thereby set in motion then moves the oscillating lever 29 to and fro in the direction of the arrow 30, and the oscillating lever thereby rubs the upper strap end 11b in relation to the fixed lower strap end 11a in the welding region at the weld location 21 until sufficient frictional heat is generated under the pressure of the pressure element 31 in order to melt the strap material at the mutually facing surfaces thereof and to cause the straps to merge with each other.

During this melting process, the pressure piece 26 which is attached to the pressure element 31 is pressed lower, whilst the sensing element 45, which rests on the straps near the weld 21 in the unwelded region, maintains its original height.

When the pressure element 31 travels downwards, the free end 46a of the driver pin 46 slides upwards in the elongated recess 49 against the action of the spring element 45, whilst the driver 57 which is fixed to the pressure element 31 presses on the lower end 53a of the operating element 53. The latter is thereby swivelled clockwise about the pivot 58 and the switching finger 54 which is disposed at its free, upper end 53b presses against the switching pin 70 of the first switch 59.

As soon as the distance d between the pressure piece 26, which constitutes the lowest point of the pressure element 31, and the supporting surface 18, and thus the total thickness of the straps which are welded to each other at the weld location 21, falls below a predetermined set value, the switching pin 70 is pressed down by the operating lever 53 to such an extent that the normally closed contact of the first switch 59 opens. The drive of the friction welding apparatus is thereby interrupted, the oscillating lever 29 and the pressure piece 26 come to a stop, and frictional heat is no longer generated, i.e. the supply of heat to the welding apparatus is interrupted.

It can be seen that the optimum set value for the total thickness of the superimposed, welded straps at the weld can be adjusted by screwing in or unscrewing the switching finger 54 in the operating element 53.

FIGS. 7 and 8 show another embodiment of the apparatus according to the invention, where parts which are identical to those of the previous embodiment are denoted by the same reference numerals. These Figures show the pressure element 31, the pressure roller 37, the peg 28 with its lifting spring 41, and the pressure piece 26, which is moved to and fro by the oscillating lever 29 and which generates frictional heat between the superimposed strap ends 11a and 11b whilst the pressure element 31 provides the requisite frictional pressure via parts 37, 28 and 26.

Just as in the previous example of an embodiment, the superimposed strap ends 11a and 11b here are also compressed whilst they are heated and fused, so that the thickness d of the superimposed straps at the weld location 21 is less after welding than it is before welding. The changes in the distance between the pressure element 31 or between the pressure piece 26 attached thereto and the supporting surface 18 are determined by a sensor 71 comprising a signal transmitter, which supplies corresponding signals to an evaluation electronics unit 72. The actual values are compared there with a predetermined set value and if the actual values and set values correspond a switch-off signal is generated by the evaluation electronics unit which interrupts the power supply to the drive of the oscillating lever 29, so that the pressure piece 26 is stopped and welding heat is no longer generated.

In FIGS. 7 and 8, the sensor 71 comprising the signal transmitter is merely illustrated schematically above the pressure element. It can also, of course, determine the downward movement of the pressure piece itself or can sense the movement of another part which is attached to the pressure element and which moves downwards therewith.

It can be seen that with the apparatuses described above it is possible to ascertain whether welding has been carried out correctly by determining the change in the total thickness of the straps which are welded to each other. The supply of welding heat is not interrupted until a predetermined total thickness of the straps to be welded to each other has been reached, by generating a control signal in order to terminate the supply of welding heat or by operating a circuit breaker.

The invention is not restricted to the embodiments which have been described and illustrated. Rather, numerous changes and additions are possible without departing from the scope of the invention.

As has been mentioned above, the welding heat can also be generated in another manner, for example by electrical resistance heating wires, which are introduced between the straps to be welded to each other and which remain at the weld after the welding operation is complete and are cut off with the upper strap end. It is also possible to insert a wire mesh between the straps and to heat it inductively, and to switch off the induction current as soon as the weld the has reached the desired thickness at which the strap surfaces have intimately fused to each other.

What is claimed is:

1. An apparatus for welding straps made of thermoplastic plastics comprising: a heating device, a pressure element movable at the weld location, a supporting surface, said heating device having a switch-off device, said switch-off device operated directly or indirectly by a pressure element when a distance between said pressure element and said supporting surface falls below a predetermined set value, said pressure element being connected to a sensing element which scans the surface of superimposed unwelded straps and which comprises an operating element for switching off said heating device, said pressure element being displaceable to a limited extent in relation to said sensing element in a direction towards said supporting surface and during displacement said pressure element acting on said operating element.

2. An apparatus according to claim 1, wherein said operating element is a lever, said lever is swivel mounted on said sensing element, said operating element is acted upon by a driver disposed on said pressure element and said operating element comprises an adjustable switching finger at one free end, said switching finger operates a first switch when the displacement of said pressure element in relation to said sensing element reaches a predetermined set value.

3. An apparatus according to claim 2, wherein said first switch comprises a normally-closed contact and is connected in series with a second switch which switches on said heating device if it is operated during the action of pressure of said pressure element.

4. An apparatus according to claim 1, wherein said heating device comprises a heating resistance wire which is disposed at said weld location between said straps which are to be welded to each other, said heating device heats said straps at said weld location, and said heating resistance wire is embedded in said straps when said straps are compressed by said pressure element.

5. An apparatus for welding straps made of thermoplastic plastics comprising: a heating device, a pressure element movable at the weld location, a supporting surface, said heating device having a switch-off device, said switch-off device operated directly or indirectly by a pressure element when a distance between said pressure element and said supporting surface falls below a predetermined set value, said sensing element comprising a driver pin, said driver pin including a free end that fits into an elongated recess, said recess extending in an axial direction in said pressure element, said driver pin being held in said recess pressed by a spring element against an end face of said recess that faces said supporting surface, said driver pin in said recess movable against the action of said spring element when said pressure element moves in relation to said sensing element in a direction towards said supporting surface during welding.

6. An apparatus for welding straps made of thermoplastic plastics comprising: a heating device, a pressure element movable at the weld location, a supporting surface, said heating device having a switch-off device, said switch-off device operated directly or indirectly by a pressure element when a distance between said pressure element and said supporting surface falls below a predetermined set value, said heating device being a friction welding device, an oscillating lever being provided which moves a pressure piece and which contacts an upper strap, said pressure piece being part of said pressure element and being pressed together with said pressure element in a direction towards said supporting surface and is moved transversely to the plane of said straps by said oscillating lever and generating frictional heat between said straps at weld location.

* * * * *